United States Patent
Garcia Martinez et al.

(10) Patent No.: US 10,202,311 B2
(45) Date of Patent: Feb. 12, 2019

(54) UREA FERTILIZER HAVING IMPROVED HARDNESS

(71) Applicant: SHELL OIL COMPANY, Houston, TX (US)

(72) Inventors: Rafael Alberto Garcia Martinez, Calgary Alberta (CA); Cyrille Paul Allais, Amsterdam (NL); Klaas Jan Hutter, Pocatello, ID (US); Charles James Ingoldsby, Calgary Alberta (CA); Carlos Moreira Tomaz, Rio de Janeiro-RJ (BR)

(73) Assignee: SHELL OIL COMPANY, Houston, TX (US)

( * ) Notice: Subject to any disclaimer, the term of this patent is extended or adjusted under 35 U.S.C. 154(b) by 68 days.

(21) Appl. No.: 15/110,265

(22) PCT Filed: Jan. 7, 2015

(86) PCT No.: PCT/EP2015/050176
§ 371 (c)(1),
(2) Date: Jul. 7, 2016

(87) PCT Pub. No.: WO2015/104296
PCT Pub. Date: Jul. 16, 2015

(65) Prior Publication Data
US 2016/0326066 A1 Nov. 10, 2016

Related U.S. Application Data

(60) Provisional application No. 61/925,346, filed on Jan. 9, 2014.

(51) Int. Cl.
*C05C 9/00* (2006.01)
*C05D 9/02* (2006.01)
*C05F 11/00* (2006.01)
*C05B 17/00* (2006.01)
*C05G 3/00* (2006.01)

(52) U.S. Cl.
CPC .............. *C05C 9/005* (2013.01); *C05B 17/00* (2013.01); *C05C 9/00* (2013.01); *C05D 9/02* (2013.01); *C05F 11/00* (2013.01); *C05G 3/00* (2013.01)

(58) Field of Classification Search
None
See application file for complete search history.

(56) References Cited

U.S. PATENT DOCUMENTS

| | | |
|---|---|---|
| 3,333,939 A | 8/1967 | Davis et al. |
| 4,587,358 A | 5/1986 | Blouin |
| 4,676,821 A | 6/1987 | Gullett et al. |
| 5,032,164 A | 7/1991 | Sanford et al. |
| 9,598,322 B2 * | 3/2017 | Allais .................... C05C 9/005 |

FOREIGN PATENT DOCUMENTS

| | | |
|---|---|---|
| WO | 20130098404 | 7/2013 |
| WO | 2014009326 | 1/2014 |

OTHER PUBLICATIONS

International Search Report for PCT/EP2015/050176; 4 pages; 2016.
Belgacem et al.; Monomers, Polymers and Composites from Renewable Resources pp. 225-241; 2008.

* cited by examiner

*Primary Examiner* — Wayne A Langel

(57) ABSTRACT

The present invention discloses a urea fertilizer having a lignin compound and elemental sulphur dispersed throughout the fertilizer and having improved hardness.

9 Claims, No Drawings

UREA FERTILIZER HAVING IMPROVED HARDNESS

PRIORITY CLAIM

The present application is the National Stage (§ 371) of International Application No. PCT/EP2015/040176, filed Jan. 7, 2015, which claims priority from U.S. Provisional Application Ser. No. 61/925,346, filed Jan. 9, 2014, incorporated herein by reference.

FIELD OF THE INVENTION

The present invention provides a urea fertiliser having improved physical properties, particularly having improved hardness and desirably also improved abrasion resistance and impact resistance.

BACKGROUND OF THE INVENTION

Urea is commonly used as a fertiliser, supplying nitrogen to plants. Urea granules are often friable, breaking into smaller particles and creating substantial amounts of dust during storage, transport and use.

U.S. Pat. No. 4,587,358 discloses that the physical properties of urea particles can be improved by incorporating formaldehyde, or, more desirably from a safety perspective, by incorporating a lignosulphonate such as calcium lignosulphonate. U.S. Pat. No. 4,676,821 discloses urea particles that contain calcium lignosulphonate and that additionally have a coating of elemental sulphur. The sulphur coating enables a controlled dissolution rate of the urea fertiliser.

The present inventors have sought to prepare a urea fertiliser having improved physical properties, in particular improved hardness.

SUMMARY OF THE INVENTION

Accordingly, the present invention provides the use of a lignin compound and elemental sulphur to prepare a urea fertiliser having the lignin compound and the elemental sulphur dispersed throughout the fertiliser and having improved hardness.

The invention further provides a urea-sulphur fertiliser composition comprising from 50 to 99 wt % urea, from 1 to 25 wt % elemental sulphur and from 0.1 to 5 wt % of a lignin compound, wherein the weight percentages are based upon the weight of the fertiliser composition, and wherein the lignin compound and the sulphur are dispersed throughout the fertiliser.

The present inventors have recognised that the combination of sulphur and lignin compound, dispersed throughout a urea fertiliser, can improve the physical properties of the fertiliser, particularly when the components are present in an amount of from 50 to 99 wt % urea, from 1 to 25 wt % of elemental sulphur and from 0.1 to 5 wt % of a lignin compound.

DETAILED DESCRIPTION OF THE INVENTION

In the present invention, a lignin compound is incorporated into a urea-sulphur fertiliser.

The lignin compound is suitably a lignosulphonate. Examples of lignosulphonates include ammonium lignosulphonate, sodium lignosulphonate, calcium lignosulphonate and potassium lignosulphonate. Preferably, the lignosulphonate is calcium lignosulphonate.

Lignin compounds are derived from lignin, which is found in the cellular material of plants, e.g. trees.

Lignins comprise polymeric propylphenol substituted moieties which are interconnected at various positions on the carbon skeleton through a phenoxy group. Lignosulphonate may be produced from lignin by a sulphite process, in which suitable feedstock such as wood is digested at 140-170° C. with an aqueous solution of calcium bisulphite in acidic conditions. A benzylic cation is formed under the stated conditions, which is quenched by the sulphite ion to produce a sulphonated derivative which is separated.

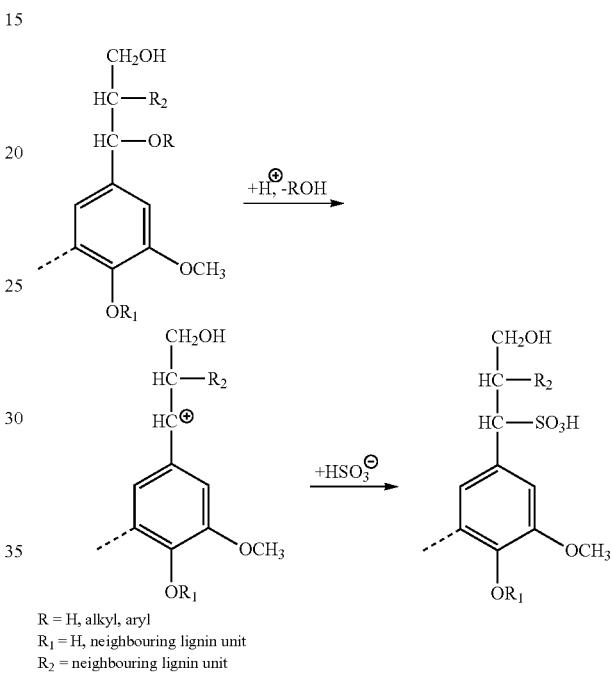

R = H, alkyl, aryl
$R_1$ = H, neighbouring lignin unit
$R_2$ = neighbouring lignin unit Details of this process are described, for example, in Monomers, Polymers and Composites from Renewable Resources; M. N. Belgacem, A. Gandini; Elsevier, 2008, 225-241.

Depending on the nature of the reaction conditions the lignosulphonate produced can contain carbohydrate components which are chemically linked to the lignosulphonate molecular framework. This material finds commercial applications as sugared lignosulphonate, which may for example have a carbohydrate content as high as 35 wt % depending on manufacturing conditions. Alcoholic fermentation of a sugared lignosulphonate mixture or selective chemical treatment by ultrafiltration can be used to remove sugar content to produce a de-sugared calcium lignosulphonate.

Lignosulphonates useful as in the present invention may be sugared lignosulphonates or de-sugared lignosulphonates and may be derived from softwood or hardwood feedstocks.

For example, sugared lignosulphonates derived from hardwood and de-sugared lignosulphonates derived from softwood have been found to be of particular use.

Preferably, the carbohydrate content of the lignosulphonates, as determined by TAPPI test method T 249 cm-85 (involves an acid treatment followed by gas chromatography analysis), may be at most 35 wt %, more preferably at most 15 wt %, even more preferably at most 5 wt %.

The molecular weight of the lignosulphonate may vary considerably and may be, for example, in the range of from 7000 to 35000 Daltons, preferably 12,000 to 28,000 Daltons.

The term lignosulphonate also encompasses mixed salts of different ions such as potassium/sodium lignosulphonate or potassium/calcium lignosulphonate.

The amount of lignin compound in the fertiliser is suitably at least 0.05 wt % based upon the weight of the urea fertiliser composition, preferably at least 0.1 wt %, more preferably at least 0.25 wt % and most preferably 0.75 wt %. The amount of lignin compound is suitably less than 10 wt %, more preferably less than 5 wt % and most preferably less than 1.5 wt %.

The amount of urea in the fertiliser is suitably at least 50 wt % based upon the weight of the urea fertiliser composition, preferably at least 60 wt % and more preferably 75 wt %. The amount of urea is suitably less than 99 wt % and more preferably less than 95 wt %.

The elemental sulphur in the urea-sulphur fertiliser may be high purity (>99.9% S) chemical sulphur as obtained from the Claus process. However, elemental sulphur of significantly lower purity can also be used. Examples of such elemental sulphur are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt. %, preferably from 50 to 99.5 wt. %, more preferably from 60 to 99.0 wt. %, sulphur, with the balance comprising lime, gypsum, silica, iron and other trace materials.

The amount of elemental sulphur in the fertiliser is suitably at least 1 wt % based upon the weight of the urea-sulphur fertiliser composition, and preferably at least 3 wt %. The amount of sulphur is suitably less than 50 wt %, more preferably less than 25 wt % and most preferably less than 7 wt %.

The preferred amounts of lignin compound and sulphur are determined by considering how much of these components are required to improve the hardness of the urea fertiliser versus the cost of these components.

The lignin compound and the elemental sulphur are dispersed throughout the fertiliser. By "dispersed throughout" the fertiliser the inventors mean that the lignin compound and the elemental sulphur are homogeneously dispersed throughout all of the fertiliser, i.e. not just at the surface, nor only at the core of the fertiliser particles. It is not desirable that the sulphur is coated onto the surface of the urea. The present inventors believe that sulphur dispersed throughout the urea matrix creates disruptions in the urea crystal structure, thereby decreasing brittleness and improving hardness. The average particle size of the elemental sulphur is suitably less than 50 μm, and preferably less than 20 μm. Suitably the average particle size of the elemental sulphur is more than 2 μm, and preferably more than 5 μm.

The urea fertiliser may comprise additional plant nutrients. Such plant nutrients may be selected, but not limited to potassium, phosphorus, nitrogen, boron, selenium, sodium, zinc, manganese, iron, copper, molybdenum, cobalt, calcium, magnesium and combinations thereof. These nutrients may be supplied in elemental form or in the form of salts such as oxides, hydroxides, sulphates, nitrates, halides or phosphates. The amount of additional plant micronutrients depends on the type of fertiliser needed and is typically in the range of from 0.1 to 30 wt %, based on the total weight of the fertiliser, preferably in the range of from 0.5 to 20 wt %.

The fertiliser may be made by a process comprising steps of:
(a) providing a first stream which comprises liquid urea;
(b) providing a second stream comprising liquid elemental sulphur;
(c) mixing the first stream and the second stream in a mixing device in the presence of a lignin compound to form an emulsion comprising micro-encapsulated elemental sulphur particles which are coated with a layer of the lignin compound, whereby a temperature is applied of more than 135° C. which maintains the elemental sulphur and the urea substantially in the liquid form in the mixing device; and
(d) subjecting the emulsion as obtained in step (c) to one or more further processing steps to obtain the urea-sulphur fertiliser.

In step (c) use is made of a mixing device. The mixing device to be used in step (c) can suitably be a dispersion mill wherein a rotor turns within a slotted stator or a static mixer. Preferably, the mixing device is a dispersion mill.

In step (c) one or more additional plant nutrients can be added and/or a defoamer may be added.

In step (d) the emulsion as obtained in step (c) is subjected to one or more further processing steps to obtain the urea-sulphur fertiliser. The one or more further processing steps comprise subjecting the emulsion to a forming process to obtain the urea-sulphur fertiliser. The forming process can suitably be a granulating process, a prilling process, a compaction process, a tablet forming process, or a compressing process.

The emulsion of elemental sulphur particles as obtained in step (c) can be combined with one or more further components to obtain a mixture of the emulsion and the one or more further components, and this can be subjected to a forming process in step (d). The one or more further components could be other fertiliser products. For example, phosphate rock could be added to the emulsion of elemental sulphur particles before it is supplied to the forming process in step (d), thereby providing a urea-sulphur-phosphate rock fertiliser. Alternatively, potassium chloride could be added to the emulsion of elemental sulphur particles before it is supplied to the forming process in step (d), thereby providing a urea-sulphur-KCl fertiliser. In one embodiment, phosphoric acid could be could be added to the emulsion of elemental sulphur particles whilst it is hot and before it is supplied to the forming process in step (d). The phosphoric acid would react with the urea, thereby providing a urea-phosphate-sulphur fertiliser. In another embodiment, the urea-sulphur emulsion or the formed urea-sulphur fertiliser can be combined with NPK fertilisers, either by adding the urea-sulphur emulsion into the NPK fertiliser production process (prior to the forming of the fertiliser) or by blending granules of urea-sulphur fertiliser with granules of NPK fertiliser.

Another material that could be incorporated into the urea-sulphur fertiliser is a clay such as bentonite. Suitably the clay could be added to the emulsion of elemental sulphur particles before it is supplied to the forming process in step (d).

The present invention enables the skilled person to prepare a fertiliser having improved hardness, i.e. by using a lignin compound and elemental sulphur to prepare a urea fertiliser having the lignin compound and the elemental sulphur dispersed throughout the fertiliser, the skilled person can prepare a fertiliser that is harder than a fertiliser that is otherwise the same but not does not have the lignin compound and elemental sulphur dispersed throughout the fertiliser. Hardness may be measured using the IFDC S-115 test (as described in the Manual for Determining Physical Properties of Fertilizer from the International Fertilizer Development Center). The fertilisers prepared according to the invention may also have improved abrasion resistance (measured using the IFDC S-116 and S-117 tests), improved impact resistance (measured using the IFDC S-118 test) and improved caking tendency (measured using the IFDC S-105 and S-106 tests).

The invention will now be demonstrated by means of an example which is not intended to be limiting of the invention.

Example

The drum granulation pilot plant of the International Fertilizer development Center (IFDC) located in Muscle Shoals, Ala. was used to granulate different fertilisers from freshly remelted urea, freshly melted elemental sulphur, and various additives.

Freshly molten urea (from PCS sourced urea microprilled), freshly molten sulphur (from commercial pastillated Canadian sulphur) and a commercial calcium lignosulphonate product were pumped into a mixing device to produce a stable emulsion of molten sulphur in molten urea. The stabilized emulsion was mixed with a granulation aid and granulated using a standard drum granulation plant consisting of a drum granulator, a rotating cooler, a series of screens and crushers, a product export belt and an internal solids recycle belt.

Various combinations of sulphur, urea, and calcium lignosulphonate were produced, and various physical properties of the granulated product were assessed by IFDC laboratories using standard IFDC procedures from the IFDC Manual for Determining Physical Properties of Fertilizer (IFDC R-10). The results are shown in Table 1:

TABLE 1

| | | Comparative Example 1 | Comparative Example 2 | Example 1 |
|---|---|---|---|---|
| Chemical Composition | N | 47% | 40% | 40% |
| | S (elemental) | 0% | 13% | 14% |
| | Calcium Lignosulphonate | 0.0% | 0.0% | 0.2% |
| Crushing Strength | Crushing Strength Average, kg/granule | 2.43 | 1.76 | 2.88 |
| | Range, kg/granule | 1.00-4.00 | 1.15-2.85 | 1.70-4.70 |
| Moisture Absorption/ Penetration | Moisture Absorption, mg/cm$^2$ | 256 | 311 | 311 |
| | Moisture Penetration, cm | 12.0 | 10.0 | 7.2 |
| | Moisture Holding Capacity, mg/cm$^3$ | 21 | 31.1 | 43 |
| | Moisture Holding Capacity, % | 3.3 | 4.3 | 5.9 |
| | Granule Integrity, wet | good | poor | excellent |

The addition of finely divided elemental sulphur to urea granules, without the presence of calcium lignosulphonate does had some positive and some negative impacts on the fertiliser physical properties compared to urea. For example, the moisture absorption, the moisture penetration, as well as the moisture holding capacity of Comparative Example 2 are superior to those of Comparative Example 1, but its crushing strength, and its granule integrity, wet, are worse than those of Comparative Example 1. Based on the above, it cannot be clearly demonstrated that finely dispersed sulphur alone increases or decreases the quality of urea's physical properties.

The addition of finely divided elemental sulphur to urea granules in the presence of a lignin additive leads to a granule of superior physical properties to those of pure urea. All the studied physical properties are superior in Example 1 compared to those of Comparative Example 1, and are equal or superior to those of Comparative Example 2. The present inventors have found that the combination of sulphur and lignin compound, dispersed throughout a urea fertiliser, can improve the physical properties of the fertiliser.

That which is claimed is:

1. A method comprising:
    incorporating a lignin compound and elemental sulphur into a urea fertilizer;
    wherein the lignin compound and the elemental sulphur are dispersed throughout the urea fertilizer; and
    wherein the lignin compound comprises a carbohydrate content of 15 wt % or less.

2. The method according to claim 1, wherein the lignin compound is a lignosulphonate.

3. The method according to claim 2, wherein the lignin compound is calcium lignosulphonate.

4. The method according to claim 3, wherein the lignin compound is present in the urea fertilizer in the amount of at least 0.25 wt %, based upon the weight of the urea fertilizer.

5. The method according to claim 4, wherein the lignin compound is present in the urea fertilizer in the amount of at least 0.75 wt %, based upon the weight of the urea fertilizer.

6. The method according to claim 5, wherein the urea fertilizer comprises from 50 to 99 wt % urea and from 1 to 25 wt % elemental sulphur, based upon the weight of the urea fertilizer.

7. The method according to claim 6, wherein the urea fertilizer comprises one or more additional fertilizer components selected from the group consisting of potassium, phosphorus, nitrogen, boron, selenium, sodium, zinc, manganese, iron, copper, molybdenum, cobalt, calcium, magnesium and combinations thereof.

8. A urea-sulphur fertilizer composition comprising:
    from 50 to 99 wt % urea, from 1 to 25 wt % elemental sulphur and from 0.1 to 5 wt % of a lignin compound,
    wherein the weight percentages are based upon the weight of the fertilizer composition,
    wherein the lignin compound and the elemental sulphur are dispersed throughout the fertilizer, and
    wherein the lignin compound comprises a carbohydrate content of 15 wt % or less.

9. A fertilizer composition according to claim 8, comprising one or more additional fertilizer components selected from the group consisting of potassium, phosphorus, nitrogen, boron, selenium, sodium, zinc, manganese, iron, copper, molybdenum, cobalt, calcium, magnesium and combinations thereof.

* * * * *